Figure 2:
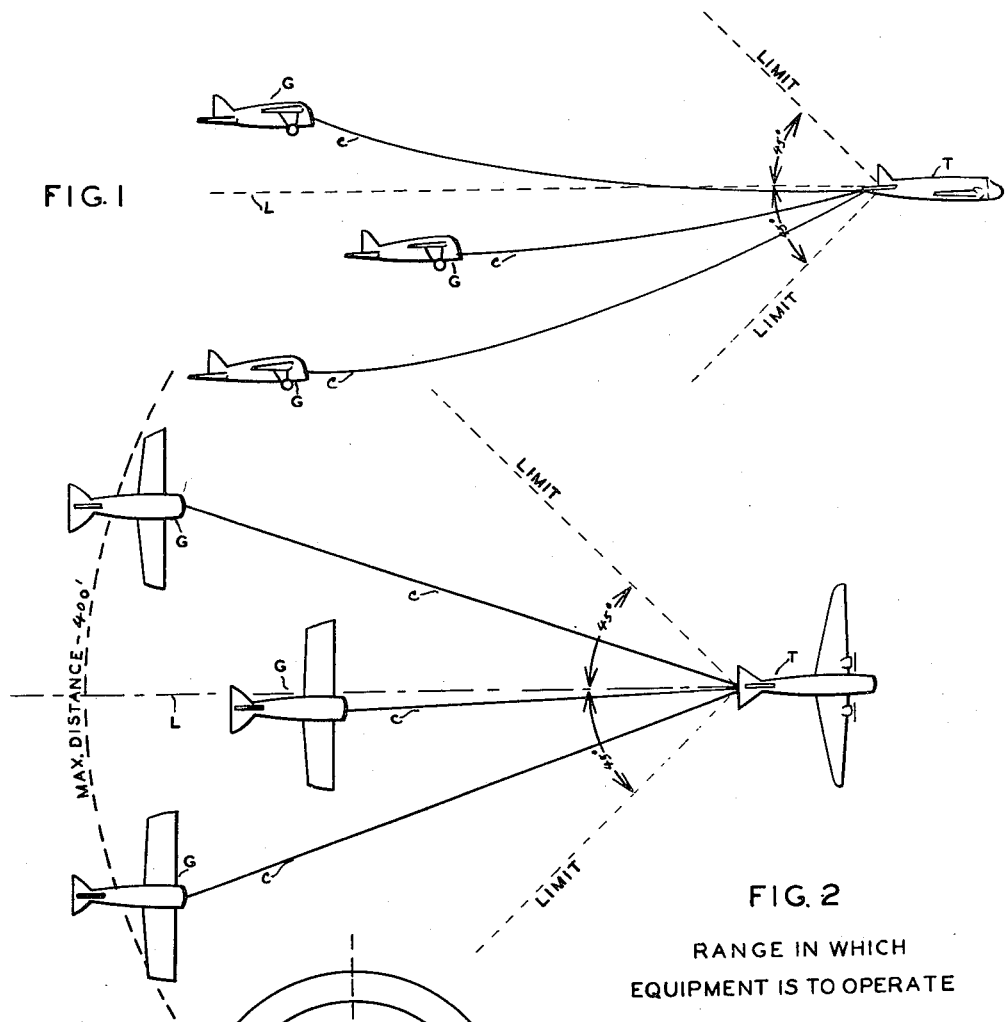

Sept. 14, 1948.  G. F. LEYDORF  2,449,532
INDICATOR SYSTEM FOR TOWED GLIDERS
Filed March 22, 1945  5 Sheets-Sheet 1

RANGE IN WHICH
EQUIPMENT IS TO OPERATE

BLIND FLYING
RECEIVING ANTENNAS

INVENTOR.
GEORGE F. LEYDORF
BY William D. Hall
Attorney

BLOCK DIAGRAM OF
BLIND FLYING EQUIPMENT

INVENTOR.
GEORGE F. LEYDORF

Sept. 14, 1948.  G. F. LEYDORF  2,449,532
INDICATOR SYSTEM FOR TOWED GLIDERS
Filed March 22, 1945  5 Sheets-Sheet 3

INVENTOR.
GEORGE F LEYDORF
BY William D. Hall
Attorney

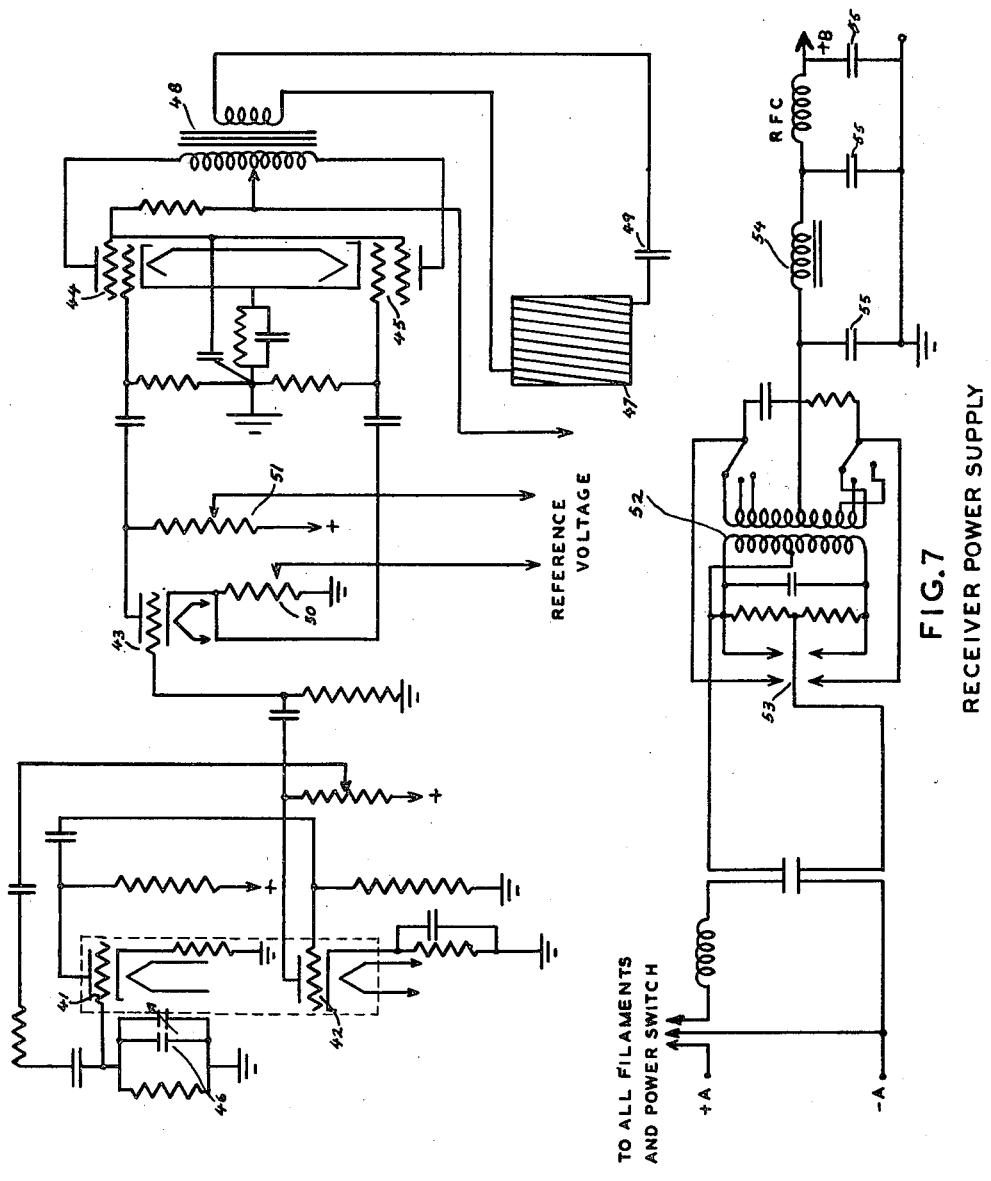

Sept. 14, 1948.  G. F. LEYDORF  2,449,532
INDICATOR SYSTEM FOR TOWED GLIDERS
Filed March 22, 1945  5 Sheets-Sheet 5

*INVENTOR.*
GEORGE F. LEYDORF
BY *William D. Hall*
*Attorney*

Patented Sept. 14, 1948

2,449,532

UNITED STATES PATENT OFFICE 2,449,532

INDICATOR SYSTEM FOR TOWED GLIDERS

George F. Leydorf, Cincinnati, Ohio, assignor, by mesne assignments, to Avco Manufacturing Corporation, a corporation of Delaware Application March 22, 1945, Serial No. 584,240

4 Claims. (Cl. 177—352)

This invention relates to a method of, and means for indicating position; more particularly, indicating the posiiton of an aircraft-towed glider with respect to the towing craft, especially under conditions where direct visual observation is not reliable or possible.

At night, in fog, and the like, it is desirable that means other than visual inspection be provided to keep the glider pilot informed of the position of the towing plane, especially in circumstances wherein a plurality of gliders are towed by a single plane. Proper operation requires that the gliders be maintained substantially in line, vertically and horizontally with the tow plane. In blind flying, audible means, such as telephonic communication, is not sufficient to accurately instruct the glider pilot of the relative position of the glider with respect to the towing plane.

It is therefore an object of this invention to provide a method and apparatus for constantly indicating the vertical and horizontal deviations of a glider from the line of flight of the tow plane, thereby enabling the pilot to manipulate the glider to follow accurately the movements of the tow plane.

A further object of this invention is to utilize the variations in direction and magnitude of the magnetic field at the glider, generated by an electrically excited coil on the towing plane, to ascertain the relative angular position of said glider with respect to said towing plane.

It is known in electrical theory that if a moving magnetic field is developed in a coil by passing an alternating current therethrough, said field may be used to induce an electromotive force in a nearby coil, provided that the two coils are magnetically related and in the proper axial position. Assuming other factors to be constant, maximum energy transfer occurs when the receiving coil has its axis disposed parallel to the flux of the transmitting coil; whereas minimum energy transfer occurs when axis of the receiving coil is perpendicular to the flux of the transmitting coil.

By setting up a magnetic field at the tow plane, this principle is utilized in accomplishing the objects of the present invention. The orientation at the glider of the flux of this field is contingent upon the position of the glider with respect to the plane. Two coils are mounted on the glider which are axially arranged to have no induced voltage when the glider is in a preassigned flight position. The axial orientation of one of the coils is made such that it is responsive to shifts occurring in a horizontal plane in the angular position of the glider in respect to the plane, whereas the axis of the second coil is so oriented that it is responsive to like shifts occurring in a vertical plane. The magnitude of the induced energy developed in the coil is proportional to the extent of glider deviation from the preassigned or zero axis. The polarity or phase of the energy in one coil reverses as the glider goes from left to right of the zero position, while in the other coil it reverses as the glider rises above or falls below the zero axis. Each coil is insensitive to changes occurring in the plane of the other.

The voltages developed in the glider coils are amplified in separate channels wherein they are combined with a reference voltage, preferably derived from the source exciting the radiating coil in the tow plane. The induced voltage and the reference voltage are algebraically added with a resultant overall increase or decrease to an extent depending upon their relative phases and magnitudes. If the total voltage increases, the glider has moved in one direction; if the voltage decreases, the glider has moved in the opposite direction. The respective outputs of the two channels are impressed upon suitable indicating devices which may be calibrated in any desired terms to provide the pilot with necessary instructions.

Figure 3:
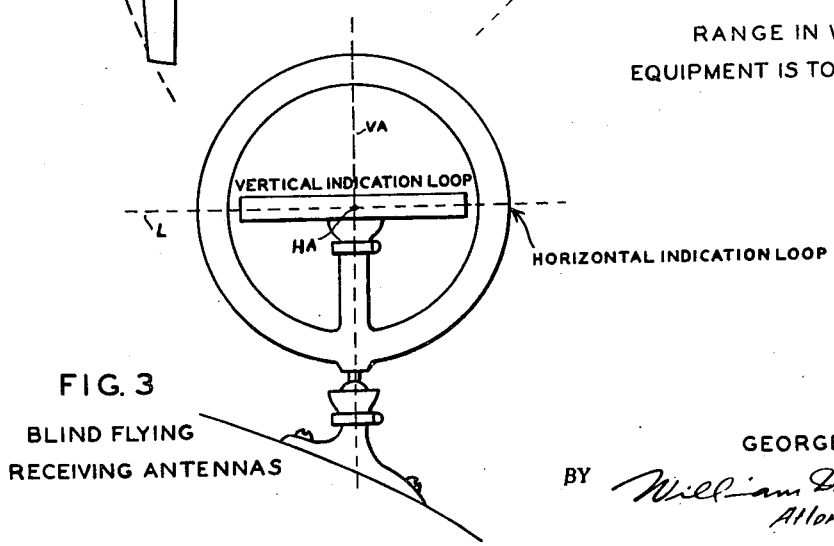
Figure 4:
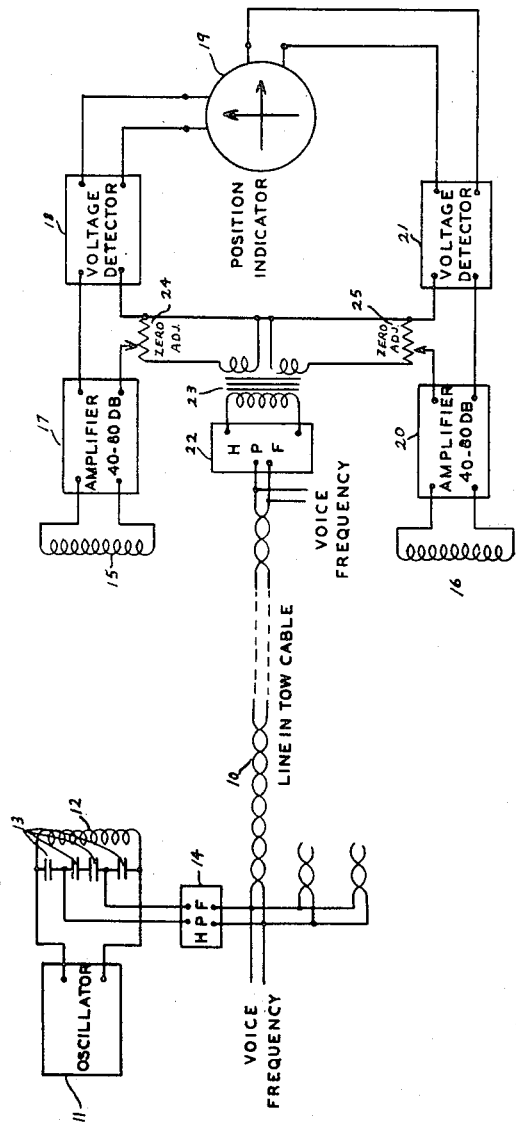
Figure 5:
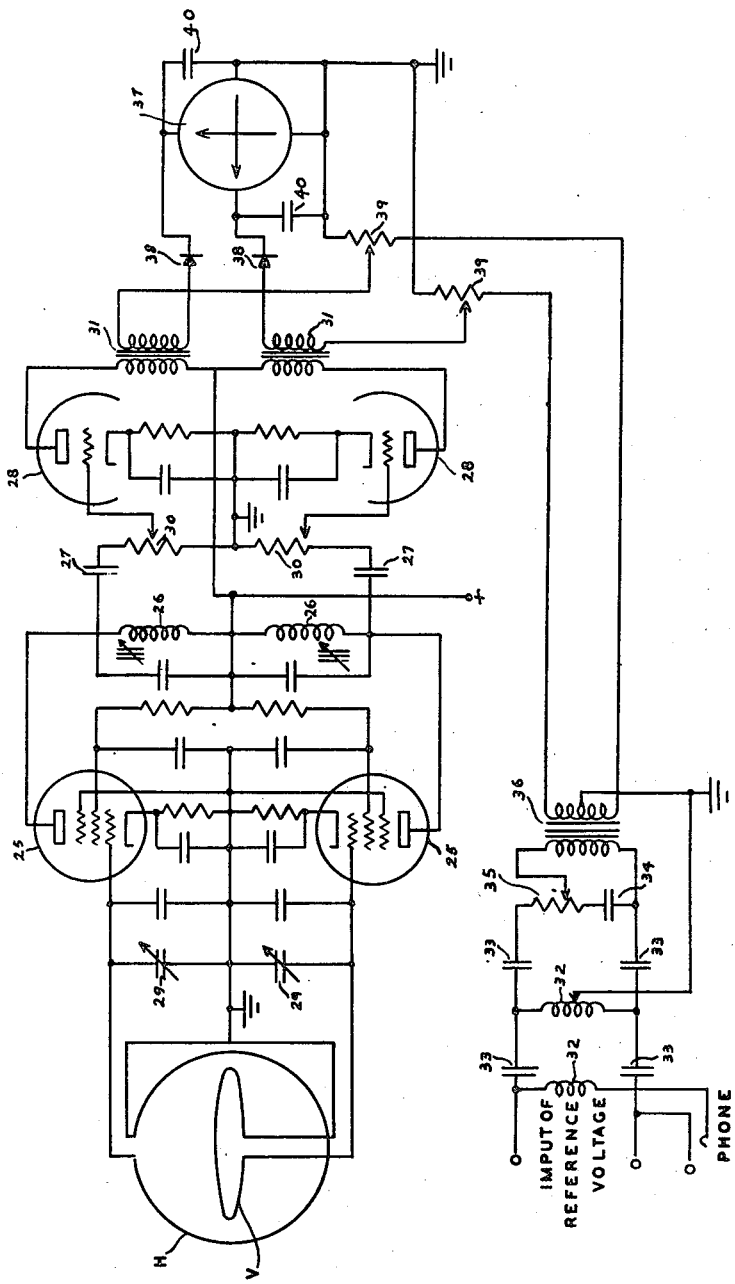
Figure 8:
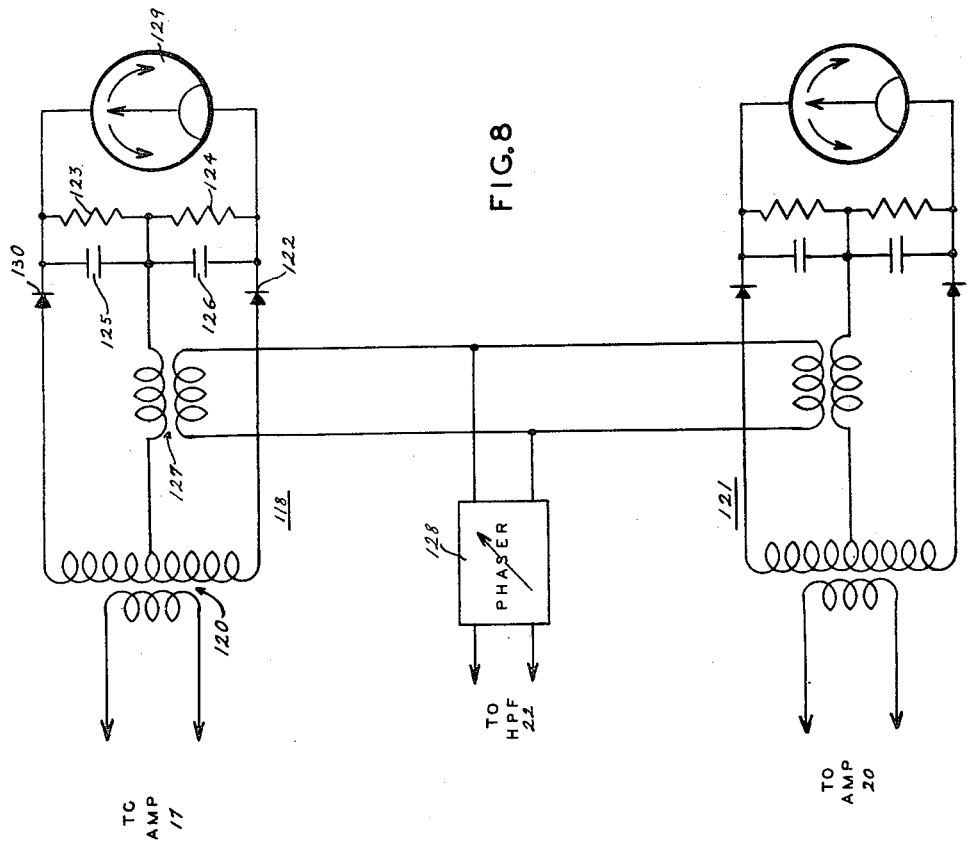

For a better and more complete understanding of the present invention, as well as further features and objects thereof, reference is had to the following description to be read in connection with the accompanying drawing, wherein:

Fig. 1 illustrates the relative changes in a vertical plane of the positions of a tow plane and a towed glider, due to certain movements of the tow plane, Fig. 2 shows the relative changes in a horizontal plane of the positions of a tow plane and a towed glider, due to certain movements of the tow plane, Fig. 3 is a view of the receiving loops mounted on the towed glider, Fig. 4 is a block diagram of one embodiment of this invention, Fig. 5 is a schematic diagram of the receiving circuit installed in the glider, Fig. 6 is a schematic circuit diagram of a transmitting device installed in the tow plane, Fig. 7 is a schematic diagram of a suitable power supply circuit, and Fig. 8 is a schematic circuit diagram of another embodiment of the invention.

Referring now to the drawings and, more particularly, to Figs. 1 and 2, the glider G is coupled to a tow plane T by a tow cable C. The function of this invention is to provide the glider G pilot with indications enabling him to maintain his course in a straight line path with plane T, indicated by dashed line L. The equipment is designed to furnish deviation readings from line L within a cone having a 45° slope in respect to its axis.

The transmitting coil radiating the magnetic field is mounted at a suitable point on the body of the tow plane T, while the receiving coils are mounted on the nose of glider G. The transmitting coil (not shown) is oriented so that its axis coincides with the line L.

The magnetic field due to a coil of the type of the transmitting coil may be described by the formula $$V = (M \cos \theta)/R^2$$

where

V = magnetic potential at a point P in the field of the coil
R = radius from coil to the point P
M = magnetic moment of coil
$\theta$ = angle between radius to P and axis of coil The field has circular symmetry about the axis, and a center of symmetry at the center of the coil. On the axis the magnetic lines of force are parallel to the axis. As a point P moves away from the axis the radius moves through the angle $\theta$ and the direction of the magnetic vector moves through an angle $\theta + \tan^{-1} (\frac{1}{2} \tan \theta)$.

Referring now to Fig. 3 showing the receiving loops, it will be seen that the axis VA of the vertical indication loop is perpendicular to the axis HA of the horizontal indication loop, the vertical indication loop being encircled by the horizontal. The loop structure is oriented and affixed to the glider in a position whereby, when the glider occupies the prearranged flight position in respect to the tow plane, the axis L of the transmitting coil is normal to the axes of the vertical and horizontal loops, running through the intersection thereof. Thus, it will be seen that as long as this position is maintained, there will be no energy induced in either receiving coil, since there is no inductive coupling in this position, the axes of both coils being perpendicular to the transmitting coil axis. However, a deviation in the position of the glider in respect to the tow plane in a vertical plane will induce energy in the vertical loop, the angle of intersection between axes L and AV being less than 90°, but have no effect upon the horizontal, the angle of intersection remaining 90°; and, similarly, deflections in the position of the glider in respect to the tow plane in the horizontal plane will induce energy in the horizontal loop, but will have no influence upon the vertical loop. The direction of deviation determines the phase of the induced energy in the receiving coils; the extent of deviation determines the magnitude of the induced energy.

This consideration thus far has assumed ideal conditions in the magnetic field. In actual practice it will be found that secondary fields will be set up due to the metallic structure of the plane and glider; consequently, it will be necessary to somewhat alter the position of the loops to arrive at an induction null point to compensate for the distortion of the field.

Referring now to Fig. 4, the apparatus contained in the tow plane and glider is illustrated in block diagram form. Running through the tow cable of fixed length is a two-wire line 10 for the purpose of carrying telephonic communication currents between the glider and the plane.

In order to obviate the necessity for an additional line to carry reference currents from the transmitter in the tow plane to the indicating device in the glider, the telephone line is also employed for this purpose in the manner of carrier current transmission.

The transmitting apparatus in the tow plane comprises an oscillator 11 of any conventional design for generating an alternating current, preferably in the order of 10,000 cycles to 15,000 cycles. Higher frequencies may be used where there is no likelihood of interference from long-wave radio channels. Connected to the output of oscillator 11 is a transmitter coil 12, resonated by the oscillator frequency by capacitors 13. A portion of the oscillator output is impressed upon the telephone line 10 through a high-pass filter 14, which serves to isolate the voice frequency currents from the oscillator circuit.

Mounted on the glider plane are a pair of perpendicularly disposed receiving coils 15 and 16 which lie within the magnetic field developed by coil 12, as described in connection with Fig. 3. The polarity and magnitude of the induced alternating currents developed in coils 15 and 16 are a function of the orientation of the glider with respect to the tow plane. Energy derived from coils 15 and 16 is separately magnified to suitable levels by amplifiers 17 and 20 respectively, both being of any conventional design. The output of amplifier 17 is rectified by a voltage detector 18 and then applied to one section of a conventional crossed-pointer type direct current meter 19, which acts as a position indicator. Likewise, the output of amplifier 20 is rectified by voltage detector 21 and applied to the other section of indicator 19. As is well-known, meter 19 consists of two independent meters with their pointers disposed in the manner indicated to permit their positions to be readily observed simultaneously.

By means of a reference voltage derived from line 10, the pointers of meter 19 are both initially set to half-scale deflection when there is zero output from the coils 15 and 16. The pointers then assume the perpendicular position shown in the diagram. This is accomplished by passing the reference voltage, obtained from line 10 through a high-pass filter 22, the output thereof being connected to the primary windings of a transformer 23 having center-tapped secondary windings. One section of the secondary winding is connected in series with the output circuit of amplifier 17 and the input circuit of detector 18, while the other section is connected in series with the output circuit of amplifier 20 and the input circuit of detector 21. The reference voltages are controlled by variable resistors 24 and 25 shunted across sections of the secondary winding of transformer 23, each of which is adjusted to a point where, when coils 15 and 16 have zero output, each pointer is deflected half-way across the scale. The phase of the reference voltage is initially so adjusted that the induced voltage will be substantially in phase or 180° out of phase therewith, depending, of course, upon the direction of deviation of the glider with respect to the line of flight, or the zero axis. The output voltages of amplifiers 17 and 20 are then algebraically added to the fixed reference voltages when the receiving coils 15 and 16 are energized, thereby causing the pointers of indicator 19 to continue up the scale from the midpoint or to return toward the zero point, depending upon whether the reference and coil voltages are in phase opposition or coincidence.

As has been hereinabove described in connection with Fig. 3, the magnitude and phase of the induced coil energy are a function of the orientation of the glider relative to the tow plane. Accordingly, the position indicator 19 will provide an index thereto, enabling the pilot to manipulate his controls to a correct course.

Referring now to Fig. 5 wherein the receiver is schematically illustrated, the outputs of receiving loops H and V are fed into separate amplifier channels. Both channels are identical in construction, each comprising a high gain input stage employing a pentode tube 25, impedance coupled by permeability-tuned choke 26 and capacitor 27 to a power stage employing a triode tube 28. Each loop is resonated to the magnetic field frequency by a condenser 29 shunted thereacross.

The gain of the amplifier is controlled by a variable resistor 30 connected in the grid circuit of triode 28 and the amplifier output is made available at the secondary winding of a plate-circuit coupling transformer 31.

The reference voltage obtained from the telephone line is fed through a high-pass filter comprising chokes 32 and condensers 33 which serves to isolate the audio voltages from the reference voltage. The phase of the reference voltage is initially adjusted relative to the receiver loop voltage by a phase-shifting series network consisting of variable resistor 34 and condenser 35 which is shunted across the primary of a coupling transformer 36. The secondary of transformer 36 is center-tapped.

The secondary of the amplifier output transformer 31 is connected to one section of the crossed-pointer meter 37 in series with one section of the secondary of the reference voltage transformer 36 through a copper oxide rectifier 38, which corresponds to voltage detector 18 or 19 in Fig. 4. The amplitude of the reference voltage is adjusted by variable potentiometer 39. Condenser 40 bridged across the meter 37 input terminal smooths out the half-wave direct current pulsations provided by rectifier 38.

Thus, the voltage applied to the meter 37 is the algebraic sum of the reference and the loop voltages. In operation, resistor 39 is adjusted so that with zero loop output the meter deflection is at the midpoint in the scale. The gain of the amplifier is then set by resistor 30 so that with maximum deviation of the glider relative to the tow plane, the meter pointer rises to full scale or zero deflection depending upon the direction of deviation.

Referring now to Fig. 6, the transmitter is schematically shown in a preferred embodiment comprising a highly stable resistance-capacity oscillator circuit employing triodes 41 and 42, a buffer stage, including triode 43, and a push-pull power amplifier stage, including screen grid tubes 44 and 45. The frequency of the oscillator is adjusted by the resistance-capacitance parallel network 46 connected in the grid circuit of tube 41. The output of the final stage is applied to the transmitting loop 47 through a coupling transformer 48, and a condenser 49 is provided for the purpose of resonating the loop to the oscillator frequency. The reference voltage for the receiver indicator is derived from the output of the buffer stage along points in variable resistors 50 and 51.

For purposes of secrecy, the power output of the transmitter may be on a level insufficient to permit detection of the magnetic field at any appreciable distance from the transmitter, e. g. one mile, but sufficient to induce easily detectable voltages in the receiving coil distinguishable from static.

The arrangement for a transmitter herein described has the advantage of being relatively free from harmonic radiation and its attendant interference with high frequency signalling. However, simpler arrangements may be used with equal effectiveness where the effects of harmonic radiation are of no importance.

A preferred form of power supply for the receiver shown in Fig. 5 is illustrated schematically in Fig. 7. The power unit is operated by a battery source which is applied to voltage step-up transformer 52 through vibrator 53, and suitable filtering means comprising choke 54 and condenser 55 are provided in conjunction with the secondary winding of transformer 52.

Fig. 8 shows a modification of the system in Figs. 4 and 5, which renders the indication of on-course position independent of changes in amplitude of the voltages involved and the phase relation of the reference voltage. The outputs of amplifiers 17 and 20 are respectively applied to balanced voltage detectors 118 and 121, wherein they are mixed with the reference voltage from high-pass filter 22. Each detector comprises a transformer 120, the secondary of which is center-tapped, and each half of said secondary is coupled to like rectifiers 130 and 122, respectively connected in series with like load resistors 123 and 124. Condensers 125 and 126 smooth the rectified output appearing across resistors 123 and 124. Also in series with the common lead of both rectifier circuits is the secondary of a transformer 127, the primary of which is connected to the source of reference voltage. An adjustable phaser 128 is used to preadjust the phase of the reference voltage, and a zero-center polarized voltmeter 129 is used to indicate changes in the combined voltages across resistors 123 and 124.

The circuit in Fig. 8 operates as follows: The reference voltage is applied through transformer 127, in like phase, or in push-push relation to both rectifiers 130 and 122, while the induced voltages in the pickup loops are applied to said rectifiers in opposed phase, or in push-pull relation. When the glider is on course, no voltage will appear across transformer 120. The reference voltage across transformer 127 will therefore be rectified by both rectifiers and the D. C. voltages will therefore be equal and opposite so that the resultant voltage across the terminals of meter 129 will be zero and the pointer will remain at the center.

When the glider is off course, a voltage will be induced across the secondary terminals of transformer 120. Preferably, the phaser 128 is so adjusted that the reference voltage is either in phase or 180° out of phase with said induced voltage. Because of the push-pull connection of the rectifier circuits, the reference voltage will be in like phase with the portion of the induced voltage applied to one rectifier, so that it will be excited by the sum of said two voltages; while the said reference voltage will be in opposed phase with the portion of the induced voltage applied to the other rectifier, so that it will be excited by the difference of the two voltages. Consequently, voltage across one of resistors 123 or 124 will be greater than the voltage across the other, so that the voltage across said resistors will no longer cancel, and meter 129 will indicate the resultant voltage.

From the above explanation, it will be obvious that if the course deviation of the glider with respect to the plane is reversed, the phases of the induced voltages applied to rectifiers 121 and 122 will be reversed and the meter 129 will indicate a resultant potential of opposite polarity.

It will be seen that changes in amplitude of the reference voltage will affect both rectifiers equally and will, therefore, not affect on-course indication, although the sensitivity of such indication will change. Furthermore, the phase relation of the reference voltage need not be exactly in phase or 180° out of phase with the induced voltage, although such phase relation will yield the most sensitive indication. In general, the system will be operative with any phase relation between the induced and reference voltages other than 90° leading or lagging. The greater the departure from said 90° relation, the greater the indication sensitivity.

The components of detector 121 are the same in structure and function as those of detector 118. Although separate meters are shown, the two can be combined into one crossed-pointer instrument.

Although the reference voltage has been shown as being transmitted over a direct line in the tow cable, it is obvious that it can be transmitted over a radio channel, thereby obviating the need of such line. Said radio channel can also be used for telephonic communication purposes. The reference voltage can also be transmitted over a radio channel from a source outside both glider and tow plane. In accordance with this mode of operation, said radio channel can also be used for homing purposes.

In taking observations of position of the towed plane by my method it is preferable that the towed plane be steered squarely against the wind stream and that the towing plane and the towed plane be maintained in normal horizontal attitude. This improves the accuracy of position indication.

From the foregoing description, it will be seen that there has been provided a relatively simple and reliable device and method for use, especially in blind flying at night, or in weather conditions of poor visibility, to enable a pilot of one craft to keep it aligned with the course of another craft.

The above description is to be considered as illustrative and not in limitation of the invention, of which modifications can be made without departing from the scope and spirit thereof, as set forth in the appended claims.

The invention having been described, what is claimed is:

1. A system for indicating the position of a glider relative to a towing plane, comprising a coil in the towing plane, an oscillator to excite the coil at an audio frequency to create a magnetic field, a tow line connecting the towing plane and the glider, a horizontal loop and a vertical loop in the glider in the magnetic field, indicating meters in the glider, and a cable supported by the tow line carrying a reference voltage from said towing plane to said meters, said reference voltage being combined with voltages induced in the loops to affect said meters when the glider deviates from the line of flight of the towing plane.

2. In a device for indicating the position of a glider relative to a towing plane, a coil in the towing plane, means to excite the coil to create a fluctuating magnetic field, indicating meters in the glider, a tow line connecting the towing plane and glider, means for passing a reference voltage over the tow line from the towing plane to said meters to normally maintain the indicating needles thereof in predetermined positions, and means in the glider to derive from said magnetic field voltages which vary with respect to said reference voltage and deflect the needles from said predetermined positions when the glider deviates from the line of flight of the towing plane.

3. A system for indicating the position of a towed vehicle with reference to an arbitrary axis in a towing vehicle comprising a coil mounted upon the towing vehicle excited by an alternating electric current of sub-radio frequency and generating an alternating inductive magnetic field the axis of circular symmetry of which is made to coincide with the arbitrary axis, a pick-up loop rigidly mounted on the towed vehicle with its plane set to contain said axis when the vehicles are in a normal spacial interrelation and having induced therein by the magnetic field an alternating indicating voltage, when said normal spacial interrelation is departed from, means supplying to the towed vehicle a reference voltage having the frequency of the exciting current in the towing vehicle and a polarity fixed with reference thereto, means by which the polarity of the reference voltage and of the indicating voltage are intercompared and thereby the position of said axis is indicated as incident on one designated side or the other of the plane of said loop including the incidence of said axis within the plane of said loop.

4. Means for indicating the position of a towed vehicle with respect to a desired normal position behind a towing vehicle, comprising a transmitting coil upon the towing vehicle excited by an alternating electric current of sub-radio frequency and generting an alternating inductive magnetic field, the field being set to direct the axis of circular symmetry of the field as desired, a receiving coil mounted upon the towed vehicle and having its axis directed to intersect the axis of the field at right angles when the towed vehicle is in a desired normal position with respect to the towing vehicle, whereby there is induced in said receiving coil by the field an indicating alternating voltage whose amplitude and polarity (including a null amplitude) is dependent upon the departure of the towed vehicle from the normal position (including no departure), means supplying to the towed plane a reference voltage having a polarity and intensity fixed with reference to that of the exciting current, means by which the intensities and polarities of the indicating and reference voltages are inter-compared and departure (including no departure) and the sense of departure of the towed plane from the normal position, is thereby indicated.

GEORGE F. LEYDORF.

REFERENCES CITED

The following references are of record in the file of this patent:

UNITED STATES PATENTS

| Number | Name | Date |
|---|---|---|
| 541,286 | Moore | June 18, 1895 |
| 1,446,385 | Hanson | Feb. 20, 1923 |
| 1,589,398 | Kelley | June 22, 1926 |
| 1,666,897 | Hammond | Apr. 24, 1928 |
| 2,119,530 | Dunmore | June 7, 1938 |
| 2,170,835 | Simon | Aug. 29, 1939 |